United States Patent [19]

Chang et al.

[11] Patent Number: 4,950,697

[45] Date of Patent: Aug. 21, 1990

[54] THERMOPLASTIC AND INJECTABLE ENDODONTIC FILLING COMPOSITIONS

[75] Inventors: Tiang-shing Chang, Westfield; Lisa N. Weddle Marchese, Cresskill, both of N.J.

[73] Assignee: Block Drug Co., Inc., Jersey City, N.J.

[21] Appl. No.: 244,291

[22] Filed: Sep. 15, 1988

[51] Int. Cl.$^5$ .................. C08L 7/00; C08K 5/10; A61K 6/08

[52] U.S. Cl. ................... 523/116; 524/269; 524/306; 524/310; 524/575.5; 433/224

[58] Field of Search ............ 523/116, 117, 173; 524/310, 269, 306

[56] References Cited

U.S. PATENT DOCUMENTS

| | | | |
|---|---|---|---|
| 2,066,117 | 10/1934 | Mayfield | 91/68 |
| 2,148,833 | 2/1938 | Raynolds | 524/317 |
| 3,031,423 | 4/1962 | Meier | 260/3.7 |
| 3,418,264 | 12/1968 | Deuter | 524/317 |
| 4,449,938 | 5/1984 | Pollak | 523/116 |
| 4,483,679 | 11/1984 | Fujisawa et al. | 433/228 |
| 4,632,977 | 12/1986 | Riazi | 528/502 |
| 4,740,245 | 4/1988 | Futami | 523/116 |

FOREIGN PATENT DOCUMENTS 525738 5/1956 Canada .
60-252404 12/1985 Japan .
655365 7/1951 United Kingdom ............ 524/310

OTHER PUBLICATIONS

Yee, "Three-dimensional obturation of the root canal using injection-molded thermoplasticized dental gutta-percha," Journal of Endodontics, vol. 3 No. 5, May 1977, pp. 168-174.

*Primary Examiner*—C. Warren Ivy
*Attorney, Agent, or Firm*—Ostrolenk, Faber, Gerb & Soffer

[57] ABSTRACT

A nonshrinkable, thermoplastic and injectable endodontic filling composition. The composition is a mixture of transpolyisoprene, either naturally produced as balata or gutta-percha, or synthesized from isoprene, and a liquid castor ester platicizer. Alternatively, the mixture comprises transpolyisoprene, a liquid castor ester platicizer and castor oil or dimethyl silicon fluid lubricant. The mixture is preferably a combination of the transpolyisoprene, the liquid castor ester plasticizer and the liquid castor oil or dimethyl silicon fluid lubricant or both. The composition is compounded to form a highly thermoplastic material which is injectable at a clinically acceptable temperature with a manually operated injection system without shrinkage of the composition after placement in a dental root canal.

12 Claims, No Drawings

THERMOPLASTIC AND INJECTABLE ENDODONTIC FILLING COMPOSITIONS

BACKGROUND OF THE INVENTION

1. Field of the Invention

The present invention relates to a thermoplastic and injectable endodontic filling composition which shows an excellent resilience and does not shrink after insertion into a dental root canal.

2. Description of the Related Art

The standard technique in obturating a dental root canal involves the insertion of filling composition into a prepared root canal. Commercially known endodontic filling compositions usually comprise a mixture of balata, zinc oxide, heavy metal sulfates and wax. These balata-based cones have been in common usage for many years. However, it is not always introduced easily into a root canal. Following introduction of the filling composition into the canal, a spreader is used to condense the composition both laterally and vertically to produce a close arrangement of the filling material to the root canal. The spreader may be heated in order to assist in this operation.

Accordingly, a need exists for an endodontic filling composition which does not shrink after insertion into a root canal. Additionally, in order to be feasible, the endodontic filling composition must possess physical properties which facilitate its introduction into the prepared root canal. Specifically, the composition must be extrudable so as to be injectable into the root canal at an elevated, but clinically acceptable, temperature. However, the composition must solidify at body temperature after placement in the root canal.

The prior art has attempted to formulate a thermoplastic endodontic filling composition. For example, U.S. Pat. No. 4,483,679 to Fujisawa et al. discloses thermoplasticized endodontic filling materials which are injectable at clinically acceptable conditions. The compositions of this patent comprise mixtures of balata or isoprene polymer and paraffin wax to provide filling compositions with relatively low softening temperatures.

U.S. Pat. No. 4,632,977 to Riazi discloses a process for altering the thermoplasticity of balata or isoprene polymer to produce a dental filling composition which is injectable by a manual syringe at clinically acceptable temperatures. The process involves a heat treatment during which a high shear force is applied to molten polymer to masticate and clip the chain length of the polymer until the melt index of the polymer reaches 50.0 gm/min.

The endodontic filling compositions produced according to these patents, however, is costly to manufacture and lack the resilience of the conventional gutta percha cone. Thus it is desirable to produce an endodontic filling material that is easily introduced into a prepared root canal and which seals the canal laterally and vertically without shrinkage.

SUMMARY OF THE INVENTION

Accordingly, an object of the invention is to provide an improved endodontic filling composition which does not shrink after placement in a prepared dental root canal.

A further object of the invention is to provide a nonshrinkable endodontic filling composition which is thermoplastic and easily injectable into a prepared root canal with a relatively low pressure injection system.

The above objects are achieved by providing, in a first embodiment, an endodontic filling composition comprising a mixture of transpolyisoprene, either naturally produced as balata or gutta percha, or synthesized from isoprene, and at least one liquid castor (i.e. ricinoleate) ester plasticizer. In a second embodiment, the composition is a mixture of the transpolyisoprene, the liquid castor ester and either, or both, castor oil or a liquid dimethyl silicone containing fluid lubricant. In both embodiments, the endodontic filling composition is compounded to form a highly thermoplastic material which is injectable at a clinically acceptable temperature range, preferably in the range of 40°–75° C., with a manually operated injection system, into a prepared dental root canal.

Unexpectedly, the compositions of the invention, substantially do not shrink after insertion into the prepared dental root canal, thus reducing root canal filling failures. Concomitantly, root canals filled with compositions of the invention do not require refilling and the accompanying greater expense and discomfort for the patient.

DETAILED DESCRIPTION OF THE INVENTION

The invention relates to improved, nonshrinkable endodontic filling compositions. The compositions are thermoplastic and injectable over a clinically acceptable temperature range of 40°–75° C., but will harden at body temperature, i.e., approximately 37° C. The compositions of the invention are thermoplastic to a degree which enables them to be manually injectable in order to avoid the added expense of motor driven injection devices. However, the compositions of the present invention can be injected by a motor driven device. In a first embodiment of the invention, the improved endodontic filling compositions comprise a mixture of transpolyisoprene and a liquid plasticizer.

The transpolyisoprene can be either naturally produced balata or gutta percha, or synthesized from isoprene. The synthesized transpolyisoprene is trans-poly 1,4-isoprene and is known as Transpip. Either natural or synthetic, the transpolyisoprene has a molecular weight of about 30,000–100,000 and is preferably in the range of 40,000–80,000. Transpolyisoprene has the general formula:

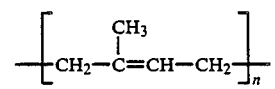

Transpolyisoprene has a softening point in the 60°–70° C. range, a melt index less than 1.0 gm/min., and a viscosity in the range of 20,000,000–100,000,000 cps at 90° C., preferably in the range of 35,000,000–80,000,000 cps. In general, the transpolyisoprene will consititute about 5–35% by weight of the composition, and preferably is about 10–30%. It will be understood that other components such as fillers, radiopaque agents, antioxidants, coloring agents, etc. may also be present in the composition.

As the liquid plasticizer, it has been discovered that castor esters provide superior plasticizing effects for transpolyisoprene. Specifically, castor esters sufficiently lower the softening temperature of the transpolyisoprene to allow the polymer to be injectable at clinically acceptable temperatures. The liquid plasticizer may be one castor ester or a combination of two or more.

The castor esters suitable for combination with the transpolyisoprene can be any of the following: butyl ricinoleate, methyl acetyl ricinoleate, butyl acetal ricinoleate, glyceryl tri (acetyl ricinoleate), propylene glycol monoricinoleate and ethylene glycol monoricinoleate. The preferable esters are methyl acetal ricinoleate and butyl acetal ricinoleate. The plasticizer, is about 0.5-10% by weight of the composition, and is preferably about 1.0-8.0%.

In a second embodiment of the invention, in addition to the plasticizer compound, it has also been discovered that the injectability of the endodontic compositions are improved by the addition of a liquid lubricant. According to the invention, the liquid lubricant particularly suitable for combination with transpolyisoprene is either castor oil, or a dimethyl silicone containing fluid, or a combination of both.

Castor oil is a mixture of triglycerides of fatty acids. Approximately 90% of the fatty acid content in the castor oil is ricinoleic acid. This acid is an 18-carbon acid, having a double bond in the 9-10 position and a hydroxyl group on the 12th carbon.

The dimethyl silicone containing fluids employed are commonly known as dimethicones. Dimethyl silicones or dimethylpolysiloxanes have the following general formula:

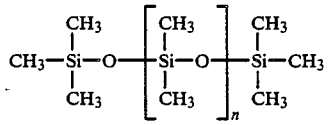

wherein n has a calculated average value of 200-350.

The dimethicone fluids have a viscosity in the range of 5-3,000 cps, and preferably in the range of 50-1,000 cps. In general, the lubricants, either castor oil or dimethicone fluid or both, are about 0.5-10% by weight of the composition, preferably about 1.0-8.0%.

In both embodiments, the compositions are mixed and compounded by a rubber mill, or other suitable device, to form a uniform mass. The compositions are then heated, either prior to placement in an injection system, or while located in an injection system. Upon being heated to a temperature of about 80° C., the compositions soften and become an injectable semisolid. Any suitable method, e.g., a manual or motor driven syringe, may then be used to inject the composition into a prepared dental root canal. The composition in the canal hardens and forms a final homogeneous dense mass which fills the dental root canal. After hardening, the filling compositions forms a permanent cone which obturates the canal substantially without deleterious voids between the cone and the canal.

According to the invention, an endodontic filling composition is provided which not only displays improved thermoplastic and extrusion characteristics, thus becoming readily injectable, but also unexpectedly reduces shrinkage of the filling after injection and solidification of the composition in the canal. This aspect of the invention represents a significant improvement in the endodontic filling composition art. Another advantage of the invention is that the fillings do not require spreading after placement in the canal, thus avoiding added time and expense for this procedure.

The following examples are given to illustrate the practice of the invention, and are in no way intended to limit the invention's scope to the below mentioned materials and proportions. All parts are given as parts by weight unless specifically stated otherwise.

EXAMPLE 1.

A thermoplastic transpolyisoprene compound was prepared by mixing together the following ingredients using a two-roll rubber mill.

| | |
|---|---|
| Transpolyisoprene (balata) | 23.00 |
| Barium sulfate | 16.00 |
| Titanium oxide | 1.00 |
| Zinc oxide | 53.25 |
| Stearic acid | 1.00 |
| Coloring agent | 0.25 |
| Antioxidant | 1.00 |
| Castor oil | 1.50 |
| Methyl acetyl ricinoleate | 3.00 |

Balata was placed on the pre-heated (65°-75° C.) rubber mill. After several passes, the balata sheeted out well enough to cling to the front roll and fed back into the nip continuously. The balata was then cut back and forth for ten minutes to ensure blending. The titanium oxide, barium sulfate, zinc oxide, stearic acid, coloring agent, antioxidant, castor oil, and methyl acetyl ricinoleate were then added. Again, the balata was cut back and forth during the addition of these ingredients to ensure blending and the uniformity of the compound. The total processing and mixing time was about 90 minutes and the operating temperature was maintained in the range of 70°-85° C.

This transpolyisoprene compound can be extruded through a 22 gauge needle with a manual syringe at a temperature about 58° C. and has a melt index about 5.0 gm/min. and a viscosity about 6,800,000 cps at 90° C. The melt index was determined by the method given in ASTM D-1238-82 and under a 2.16 kg load and at 190° C.

EXAMPLE 2.

The following ingredients were compounded with the same process employed in Example 1.

| | |
|---|---|
| Transpolyisoprene (balata) | 21.80 |
| Barium oxide | 15.60 |
| Titanium oxide | 1.00 |
| Zinc oxide | 53.35 |
| Stearic oxide | 2.00 |
| Coloring agent | 0.25 |
| Antioxidant | 1.00 |
| Castor oil | 3.00 |
| Methyl acetyl ricinoleate | 2.000 |

This transpolyisoprene compound can be extruded through a 22 gauge needle with a manual syringe at a temperature about 53° C. and has a melt index about 7.0 gm/min. and a viscosity about 6,800,000 cps at 90° C.

EXAMPLE 3.

The following ingredients were compounded with the same process employed in the Example 1.

| | |
|---|---|
| Transpolyisoprene (Transpip TP301) | 21.60 |

| | |
|---|---|
| Barium sulfate | 15.60 |
| Zinc oxide | 52.55 |
| Titanium oxide | 1.00 |
| Stearic acid | 2.00 |
| Coloring agent | 0.25 |
| Antioxidant | 1.00 |
| Castor oil | 4.00 |
| Methyl acetyl ricinoleate | 2.00 |

This compound can be extruded through a 22 gauge needle with a manual syringe at a temperature about 42° C. The compound has a melt index about 3.0 gm/min. and a viscosity about 3,940,000 cps at 90° C.

EXAMPLE 4.

The following ingredients were compounded with the same process employed in the Example 1.

| | |
|---|---|
| Transpolyisoprene (balata) | 22.00 |
| Barium sulfate | 17.60 |
| Zinc oxide | 49.68 |
| Stearic acid | 2.20 |
| Coloring agent | 0.27 |
| Antioxidant | 1.65 |
| Butyl acetyl ricinoleatee | 6.60 |

This transpolyisoprene compound can be extruded through a 22 gauge needle with a manual syringe at a temperature about 49° C. and has a melt index about 3.8 gm/min. and a viscosity about 8,100,000 cps at 90° C.

EXAMPLE 5.

The following ingredients were compounded with the same process employed in the Example 1.

| | |
|---|---|
| Transpolyisoprene (balata) | 21.50 |
| Barium sulfate | 17.25 |
| Zinc oxide | 48.60 |
| Stearic acid | 2.15 |
| Coloring agent | 0.30 |
| Antioxidant | 1.60 |
| Butyl acetyl ricinoleate | 6.45 |
| Castor oil | 2.15 |

This transpolyisoprene compound can be extruded through a 22 gauge needle with a manual syringe at a temperature about 46° C. and has a melt index about 9.0 gm/min. and a viscosity about 5,900,000 cps at 90° C.

EXAMPLE 6.

The following ingredients were compounded using the same procedure employed in the Example 1.

| | |
|---|---|
| Transpolyisoprene (balata) | 19.80 |
| Barium sulfate | 15.84 |
| Zinc oxide | 53.70 |
| Stearic acid | 1.98 |
| Coloring agent | 0.25 |
| Antioxidant | 1.49 |
| Methyl acetyl ricinoleate | 5.94 |
| Dimethicone L-45 | 1.00 |

This transpolyisoprene compound can be extruded through a 22 gauge needle with a manual syringe at a temperature about 51° C. and has a melt index about 11.4 gm/min. and a viscosity about 8,500,000 cps at 90° C.

Although the present invention has been described in connection with a plurality of preferred embodiments thereof, many other variations and modifications will now become apparent to those skilled in the art. Therefore, the present invention is to be limited not by the specific disclosure herein, but only by the appended claims.

What is claimed is:

1. A nonshrinkable, thermoplastic and injectable endodontic filling composition comprising transpolyisoprene and a plasticizing amount of at least one liquid ricinoleate ester plasticizer, wherein said transpolyisoprene has a molecular weight of about 30,000 to 100,000.

2. An endodontic filling composition as claimed in claim 1, further comprising at least one liquid lubricant selected from the group consisting of castor oil and dimethicone fluid.

3. An endodontic filling composition as claimed in claim 1, wherein said ricinoleate ester is selected from the group consisting of butyl ricinoleate, methyl acetyl ricinoleate, butyl acetyl ricinoleate, glyceryl tri(acetyl ricinoleate), propylene glycol monoricinoleate and ethylene glycol monoricinoleate.

4. An endodontic filling composition as claimed in claim 1, wherein said transpolyisoprene is selected from the group consisting of balata, gutta percha or synthesized trans-poly 1,4-isoprene.

5. An endodontic filling composition as claimed in claim 3, wherein said ricinoleate ester is methyl acetyl ricinoleate.

6. An endodontic filling composition as claimed in claim 3, wherein said ricinoleate ester is butyl acetyl ricinoleate.

7. An endodontic filling composition as claimed in claim 1, wherein said plasticizing effective amount is about 0.5-10 wt. % of said composition.

8. An endodontic filling composition as claimed in claim 7, wherein said plasticizing effective amount is 1-8 wt. % of said composition.

9. An endodontic filling composition as claimed in claim 2, wherein said dimethicone fluid has a viscosity in the range of about 5-3,000 cps.

10. A nonshrinkable, thermoplastic and injectable endodontic filling composition comprising a mixture of transpolyisoprene, a plasticizing amount of at least one liquid ricinoleate ester plasticizer, and a lubricating amount of at least one liquid lubricant selected from the group consisting of castor oil and dimethicone fluid, said mixture being compounded to form an injectable uniform mass temperatures of about 40° C. to 75° C. for filling a prepared root canal, wherein said transpolyisoprene has a molecular weight of about 30,000 to 100,000.

11. An endodontic filling composition as claimed in claim 10, wherein said ricinoleate ester is selected from the group consisting of butyl ricinoleate, methyl acetyl ricinoleate, butyl acetyl ricinoleate, glyceryl tri(acetyl ricinoleate), propylene glycol monoricinoleate and ethylene glycol monoricinoleate.

12. An endodontic filling composition as claimed in claim 10, wherein said transpolyisoprene is selected from the group consisting of balata, gutta percha, and synthesized trans-poly 1,4-isoprene.

* * * * *